United States Patent Office 3,451,981
Patented June 24, 1969

3,451,981
POLYMERIZATION OF VINYL CHLORIDE AND MIXTURES OF VINYL ACETATE AND ETHYLENE USING TERTIARY ALKYL PER-3-ALKENOATES AS CATALYSTS
Louis J. Rekers, Wyoming, Irving L. Mador, Cincinnati, and Ragnar S. Solvik, Wyoming, Ohio, assignors to National Distillers and Chemical Corporation, New York, N.Y., a corporation of Virginia
No Drawing. Continuation-in-part of application Ser. No. 470,899, July 9, 1965. This application June 29, 1966, Ser. No. 561,378
Int. Cl. C08f 1/60, 3/30, 3/04
U.S. Cl. 260—87.3       10 Claims

ABSTRACT OF THE DISCLOSURE

Polymerization processes for vinyl chloride and mixtures of vinyl chloride and ethylene using as catalysts tertiary alkyl per-3-alkenoates, and more particularly tertiary butyl-per-3-butenoate, at temperatures of 50° to 250° C. and pressures of 10,000 to 45,000 p.s.i.

---

This is a continuation-in-part of copending application Ser. No. 470,899, filed July 9, 1965.

The present invention relates to novel catalysts for the polymerization of unsaturated compounds that contain the non-aromatic polymerizable group

and to a process using the new catalysts for the polymerization of said compounds. More particularly, the invention relates to new peroxy compounds, tertiary alkyl per-3-alkenoates, to the preparation of said peroxy compounds and to a process for effecting the polymerization of vinyl chloride and the copolymerization of ethylene and vinyl acetate.

It is well known that peroxide-type compounds may be used as catalysts in the high pressure conversion of ethylene to polyethylene. Included among these compounds are tertiary alkyl peroxy esters of aromatic acids such as benzoic acid (U.S. Patent 2,497,323) and of saturated aliphatic acids such as acetic, isobutyric, and pivalic acids (U.S. Patent 2,903,513), peroxy compounds having an olefinic unsaturation which is conjugated with an acyl group such as diacyl peroxides of alpha, beta-unsaturated acids (German Patent 1,170,641), and peroxydicarbonates (U.S. Patent 2,464,062). While these peroxy derivatives are useful as polymerization catalysts, they have some disadvantages with respect to commercial usage. The solid peroxide catalysts are often not readily soluble in common organic solvents, which creates problems involving the safe and convenient storage of these compounds, particularly when they are sensitive to shock. Furthermore, many of the known peroxide catalysts have a half-life that is too long, and, consequently, polymerization in the presence of such catalysts must be carried out at higher temperatures. This results in polymers having undesirable or less desirable properties such as lower density, lower tensile strength, and poorer clarity.

One object of the present invention is to provide novel peroxy polymerization catalysts which avoid the disadvantages of the prior art peroxy catalysts.

Another object of the present invention is to provide novel peroxy polymerization catalysts which are comparatively stable compounds during storage and handling, preferably liquid, and which have a relatively short half-life.

A further object of the present invention is to provide an improved polymerization process utilizing the novel peroxy catalysts of this invention.

A still further object of the present invention is to provide an improved high pressure, catalytic process for the preparation of polyvinyl chloride and ethylene/vinyl acetate copolymer.

These and other objects of the present invention will become readily apparent from the ensuing description and illustrative embodiments.

In accordance with the present invention, novel peroxy catalysts have been discovered having the following structural formula, which may be considered to be a tertiary-alkyl peroxy ester of 3-butenoic acid;

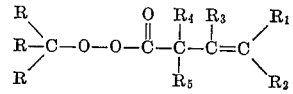

wherein the R's are alkyl groups having from about 1 to 6 carbon atoms, preferably lower alkyls having from 1 to 3 carbon atoms, and wherein the R's may be the same or different. $R_1$ through $R_5$ may be hydrogen; a halogen such as chlorine, bromine, etc.; a lower alkyl having from 1 to 3 carbon atoms such as methyl, ethyl, propyl, etc.; an aryl having from 6 to 10 carbon atoms, such as phenyl, napthyl, tolyl, or xylyl; an aralkyl having from 7 to 12 carbon atoms, such as benzyl, phenetyl, etc.; and a cycloalkyl or alkyl substituted cycloalkyl having from 5 to 10 carbon atoms, such as cyclopentyl, cyclohexyl, etc. Compounds wherein at least $R_4$ or $R_5$ is a hydrogen are preferred. In such peroxy compounds, the presence of active hydrogens enables the peroxy catalyst to initiate polymerization from at least two sites, thereby contributing to both high catalyst efficiency and a broader molecular weight distribution in the final polymer. Examples of such compounds are t-butyl per-3-butenoate, t-butyl per-2-methyl-3-butenoate, t-butyl-per-2-ethyl-3-butenoate, t-butyl per-4-methyl-3-butenoate, t-amyl per-2-phenyl-4-chloro-3-butenoate, and t-butyl per-2-cyclohexyl-3-butenoate.

For the purposes of this invention the preferred compound is t-butyl per-3-butenoate. It is a liquid which is insensitive to shock and is readily soluble in the common organic solvents. Accordingly, this peroxy compound can be stored and transferred more efficiently and more safely than conventional solid peroxide catalysts. Another advantage is that this peroxy compound does not tend to freeze out of solution when handled at low temperatures.

In preparing the peroxy compounds of this invention an alkali metal salt, preferably the potassium salt, of a tertiary alkyl hydroperoxide is reacted with an appropriate 3-butenoyl halide according to the equation

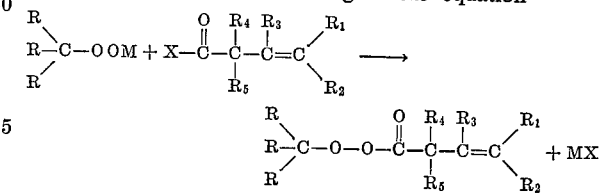

M is an alkali metal from the group consisting of potassium, sodium, etc.; X is chlorine or bromine; and R and $R_1$ through $R_5$ are as aforedefined.

The reaction is most conveniently carried out by slowly adding the desired tertiary alkyl hydroperoxide to a cold, aqueous, alkali metal hydroxide, e.g., potassium hydroxide, solution to form the alkali metal salt. To the resulting aqueous solution an approximately stoichiometric amount of the desired 3-butenoyl halide, dissolved in an organic solvent immiscible with water, e.g., benzene, toluene, xylene, and chloroform, is slowly added. The reaction is then completed by stirring for a short period of time, after which the organic phase containing the tertiary alkyl per-3-butenoate is separated from the aqueous phase. The temperature during the contacting of the reactants and the ensuing reaction is kept within the range of about −25° to 25° C., preferably between about −10° to 15° C. Contaminants may be removed from the solution containing the peroxide compound by washing with an aqueous solution of $Na_2SO_3$ buffered to about pH 7 with $KHSO_3$.

The product is isolated by evaporating the solvent under reduced pressure, but it is preferable and most convenient to store and use the peroxide in the solution of the organic solvent in which it is synthesized.

The polymerization of ethylene in the presence of the tertiary alkyl per-3-alkenoates is effected at elevated temperatures in the range of about 50° to 250° C., preferably at about 90° to 170° C., at a pressure in the range of about 10,000 to 45,000 p.s.i., preferably at about 25,000 to 35,000 p.s.i. About 0.001 to 0.05 wt. percent, preferably about 0.01 to 0.03 wt. percent, of the catalyst based on the ethylene feed into the polymerization reactor is used. It will be understood that conventional high pressure polymerization process equipment, operating conditions, and polymer separation procedures may be employed in the polymerization process of this invention, the essential point of novelty being the use of the afore-described peroxy catalysts. In addition to ethylene, other suitable ethylenically unsaturated hydrocarbons include alkenes having from 3 to 5 carbon atoms such as propylene, butene, isobutylene, neohexene, etc. Furthermore, copolymers of more than one alkene as well as copolymers of alkenes plus other monomeric compounds such as vinyl acetate, methyl methacrylate, methyl acrylate, etc., may also be produced in accordance with the process of this invention. Conventional diluents, modifiers, and other additives may be utilized.

The invention will be more fully understood by reference to the following illustrative embodiments.

Example I

An aqueous solution (9.1 ml.) containing 0.17 gram of KOH/ml. was placed in the reactor and cooled to 5° C. To this solution 3.0 ml. of Lupersol 90 (t-butyl hydroperoxide) was added slowly so that the temperature did not rise above 15° C. After recooling the solution to 5° C., 2.7 ml. of 3-butenoyl chloride in 10 ml. xylene was added over a 30-minute period. Maximum temperature during the addition was 10° C. The reaction was stirred for an additional 30 minutes, and the aqueous phase was separated and drawn off. The organic phase was washed four times by stirring with 10 ml. of 5% aqueous $Na_2SO_3$ buffered to pH 7 with $KHSO_3$. The organic phase was then dried overnight with anhydrous $MgSO_4$. Determination of the peroxide content of the organic phase indicated a yield of 64% of theory.

The one minute half-life temperature for this compound was found to be 100° C. This one minute half-life is in the range considered useful for peroxide-type ethylene polymerization catalysts, namely, between about 100° and 170° C. Being at the lower end of this range is particularly desirable, since it permits the use of lower polymerization temperatures. Lower temperatures in turn lead to polyethylene of higher density and accompanying higher tensile strength as well as better clarity. It should be understood that half-lives cannot be readily predicted from even rather closely related structures. For example, tertiary butyl peroxy crotonate, an isomer of tertiary butyl per-3-butenoate, wherein the double bond is positioned alpha-beta instead of beta-gamma to the carbonyl group, exhibited a one minute half-life at about 170° C. This is considerably higher than the 100° C. value for the tertiary butyl per-3-butenoate.

Example II

Pure ethylene was fed into a commercial high pressure reactor at a gas feed rate of about 35,000 lbs. per hr. At the same time, 0.015 wt. percent of tertiary butyl per-3-butenoate, based on the ethylene feed, was fed into the reactor in the form of a 10 wt. percent solution in light mineral oil. The temperature inside the reactor was 140° C., the reactor pressure was maintained at 30,000 p.s.i., and average residence time was 0.6 minute. Cyclohexane modifier was added at such a rate as to produce a melt index of 2.5. Polyethylene was continuously produced at a rate of 3200 lbs. per hr. The polyethylene product had a density of 0.933.

In comparison to a polyethylene produced by a peroxy catalyst of similar one minute half-life, i.e., diisopropyl peroxy dicarbonate (one minute half-life at 96° C.), this polyethylene had better extrusion characteristics, indicating broader molecular weight distribution. Accordingly, this polyethylene provides a resin highly suitable for film of good clarity and for injection molding.

The polymerization of ethylenically unsaturated compounds such as vinyl chloride and vinyl acetate also can be accomplished by using as catalysts the peroxides of this invention.

Example III

Into a stirred 5-gallon autoclave was fed 25 pounds of demineralized water containing 0.1 percent of methyl cellulose as a protective colloid. To this was added 10 pounds of vinyl chloride monomer and 0.01 pound of t-butyl per-3-butenoate as the polymerization catalyst. The temperature inside the reactor was brought to 130° F. and heating was continued for 14 hours, at which time the unpolymerized vinyl chloride was vented off; the contents of the reactor were then cooled to room temperature and discharged. Approximately 90 percent of the monomer charge had polymerized to polyvinyl chloride. The polyvinyl chloride was filtered off, washed with water, and dried. The product had a bulk density of 20 lbs./cu. ft. and a solution viscosity of 2.4 $(g./dl.)^{-1}$.

The polymerization rate achieved with t-butyl per-3-butenoate was more uniform than rates attained with the conventional vinyl chloride polymerization catalysts, e.g., lauroyl peroxide. Extrusion of the polyvinyl chloride made with t-butyl per-3-butenoate indicated that it had better flow properties (broader molecular weight distribution) than polyvinyl chloride resin made similarly with a conventional catalyst, e.g., lauroyl peroxide.

Example IV

Vinyl acetate (127 grams) and t-butyl alcohol (1870 grams) were added to a 1-gallon autoclave which was carefully purged by pressuring and depressuring with purified nitrogen. Then 1.1 grams of t-butyl per-3-butenoate was injected into the autoclave under an inert atmosphere. The autoclave was then pressurized to 3100 p.s.i.g. with purified ethylene and heated to 130° F. Pressure was maintained between 2500 and 3100 p.s.i.g. for 6 hours by periodically adding more ethylene to the autoclave. After 6 hours the contents of the reactor were discharged into a vented collection pot, cooled, filtered, and the solid product dried under vacuum; 84 grams of ethylene/vinyl acetate copolymer product was recovered. The dried copolymer resin had a melt index of 125 and contained 14.2 weight percent of vinyl acetate.

The above data demonstrate that the present invention involves novel peroxy compounds and that such novel peroxy compounds are especially suitable as catalysts for the polymerization and copolymerization of ethylenically unsaturated compounds such as ethylene, vinyl chloride, and vinyl acetate.

While particular embodiments of this invention are shown above, it will be understood that the invention is obviously subject to variations and modifications without departing from its broader aspects.

What is claimed is:

1. In a process for the catalytic polymerization of vinyl chloride at elevated temperatures and pressures, the improvement which comprises carrying out said polymerization in the presence of a catalytic amount of a peroxy compound having the formula

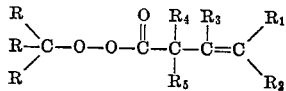

wherein R is an alkyl group, and wherein $R_1$ through $R_5$ are selected from the group consisting of hydrogen, halogen, lower alkyl, aryl, aralkyl, and cycloalkyl groups.

2. The process of claim 1 wherein said polymerization is carried out at a temperature within the range of about 50° to 250° C. and at a pressure within the range of 10,000 to 45,000 p.s.i.

3. The process of claim 1 wherein said peroxy compound is tertiary butyl per-3-butenoate.

4. The process of claim 1 wherein the amount of peroxy compound employed is within the range of about 0.001 to 0.05 percent by weight based on the total weight of the vinyl chloride.

5. In a process for the preparation of polyvinyl chloride which comprises the catalytic polymerization of vinyl chloride at elevated temperatures and pressures, the improvement which comprises carrying out said polymerization in the presence of a catalytic amount of tertiary alkyl per-3-butenoate.

6. In a process for the catalytic copolymerization of ethylene and vinyl acetate at elevated temperatures and pressures, the improvement which comprises carrying out said copolymerization in the presence of a catalytic amount of a peroxy compound having the formula

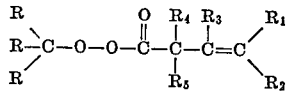

wherein R is an alkyl group, and wherein $R_1$ through $R_5$ are selected from the group consisting of hydrogen, halogen, lower alkyl aryl, aralkyl, and cycloalkyl groups.

7. The process of claim 6 wherein said copolymerization is carried out at a temperature within the range of about 50° to 250° C. and at a pressure within the range of about 10,000 to 45,000 p.s.i.

8. The process of claim 6 wherein said peroxy compound is tertiary butyl per-3-butenoate.

9. The process of claim 6 wherein the amount of peroxy compound employed is within the range of about 0.001 to 0.05 percent by weight based on the total weight of the ethylene and vinyl acetate.

10. In a process for the preparation of an ethylene/ vinyl acetate copolymer which comprises the catalytic copolymerization of ethylene and vinyl acetate at elevated temperatures and pressures, the improvement which comprises carrying out said copolymerization in the presence of a catalytic amount of tertiary alkyl per-3-butenoate.

References Cited

UNITED STATES PATENTS

| | | | |
|---|---|---|---|
| 2,436,256 | 2/1948 | Hanford et al. | 260—87.3 |
| 2,467,234 | 4/1949 | Sargent et al. | 260—87.3 |
| 2,661,363 | 12/1953 | Dickey | 260—453 |
| 2,698,863 | 1/1955 | Dickey | 260—453 |
| 2,765,297 | 10/1956 | Heiligmann | 260—87.3 |
| 3,131,168 | 4/1964 | Ilncykyj et al. | 260—87.3 |

OTHER REFERENCES

Yurzhenko et al., Akad. Nauk SSR Dokle, 164, 1335–8 (1965), Q60A4 (pp. 1335–8).

JOSEPH L. SCHOFER, *Primary Examiner.*

J. C. HAIGHT, *Assistant Examiner.*

U.S. Cl. X.R.

260—86.7, 88.1, 88.2, 89.1, 92.8, 93.7, 94.8, 94.9